June 14, 1932.  A. MARAGOS  1,862,965

AUTOMATIC SANDWICH TOASTER

Filed Oct. 16, 1928  2 Sheets-Sheet 1

A. Maragos
by Philip A. T. Purcell ATTORNEY.

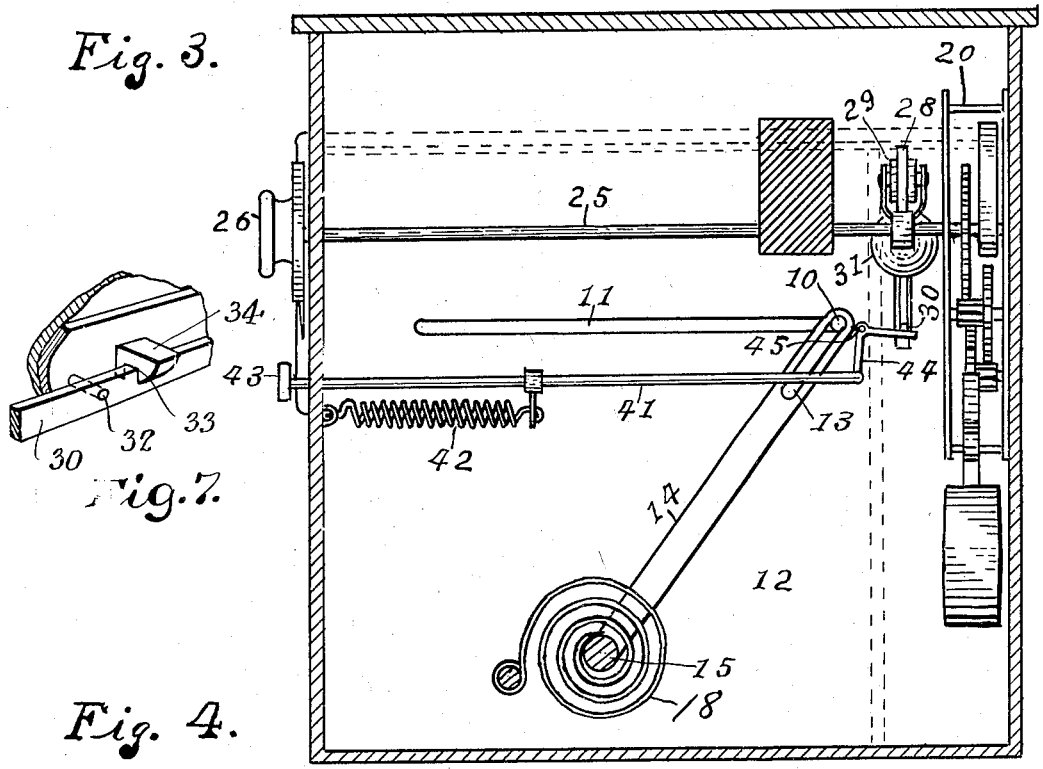
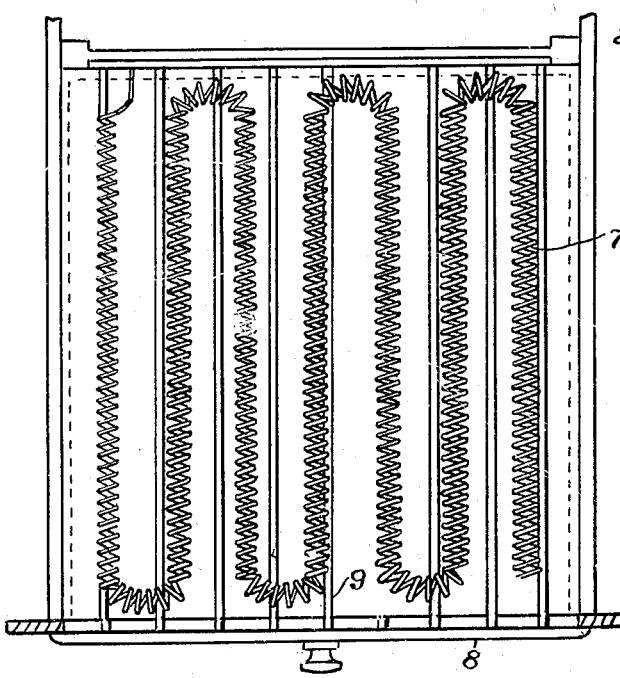
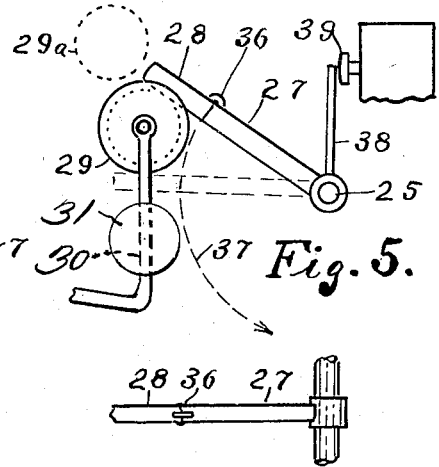
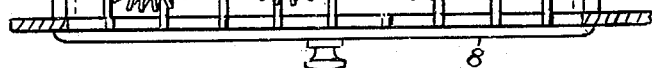

Patented June 14, 1932

1,862,965

UNITED STATES PATENT OFFICE

ALEXANDER MARAGOS, OF OMAHA, NEBRASKA

AUTOMATIC SANDWICH TOASTER

Application filed October 16, 1928. Serial No. 312,759.

The invention relates to toasting ovens and has for its object to provide a device of this character, specifically intended for use as a sandwich toaster adapted to perform this operation with speed and precision.

A further object is to provide a device that will subject an article of this kind to a uniform temperature of any required intensity throughout an automatically timed interval and while exposed upon both sides to direct rays of radiant heat emanating from electrically heated coils.

A further object is to provide an oven susceptible of practically instantaneous automatic operation of its entrance closure that will prevent the escape of heated gases within while discharging its product and thus retain a uniform temperature.

A further object is to provide an electric toaster comprising a casing having a drawer slidably mounted therein, in which toast may be placed between upper and lower heating elements, spring means cooperating with the drawer for normally forcing the same to open position, said spring means comprising a spring rotated shaft, lugs carried by the drawer and engaging in elongated slots in the arms and latching means time controlled and cooperating with the drawer whereby said drawer will be released at a predetermined period.

A further object is to provide the time mechanism shaft with an arm having a hinged section, spring held, whereby upon turning of the time mechanism shaft to a predetermined position, the hinged section of the arm will ride over a roller carried by the drawer latch arm and will assume a position below the roller whereby upon retrograde movement of the arm the hinged section thereof will engage the roller and rock the latch arm to open position.

A further object is to provide manual means whereby the drawer latch may be released as desired independent of the time control means.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 3 is a vertical transverse sectional view taken on line 3—3 of Figure 1.

Figure 4 is a top plan view of the toasting drawer.

Figure 5 is a side view of the operating lever of the electric switch and drawer catch device.

Figure 6 is a top plan view of the operating arm.

Figure 7 is a detail perspective view of the keeper member and a portion of the pivoted lever.

Figure 1:
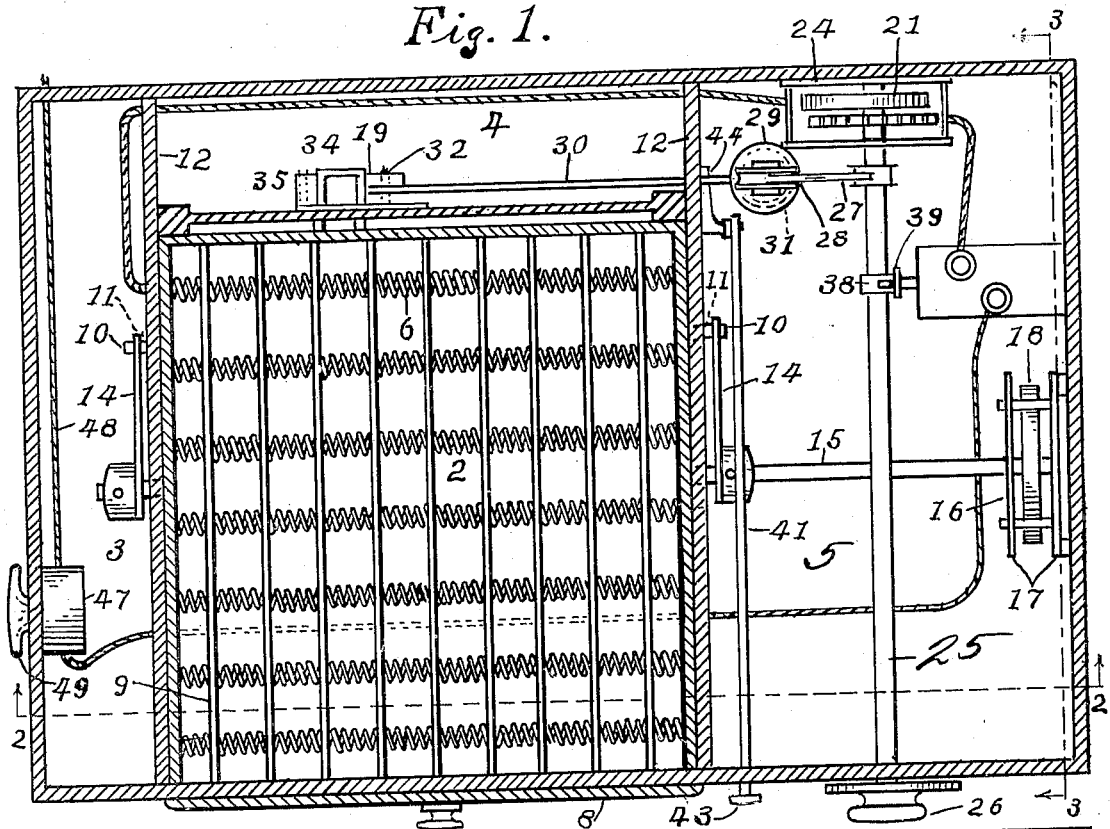
Figure 1 is a horizontal sectional view through the device taken on line 1—1 of Figure 2.

Referring to the drawings, the numeral 1 designates sectional view of a toasting oven in the form of a cabinet composed of metal, preferably aluminum, or other suitable material comprising a toasting chamber 2, insulating air chambers 3 and 4 and chamber 5 containing the timing and drawer operating mechanism.

Within the toasting chamber 2 is provided an upper electric heating coil 6 and a lower heating coil 7. Intermediate these coils is disposed a toasting drawer 8, the bottom comprising longitudinal bars 9 adapted to retain toasting material intermediate the upper and lower heating coils; its rear end covering the full transverse area of its slideway so that when fully withdrawn there will be no unclosed outlet for escaping gases.

Disposed upon opposite sides of the drawer, adjacent its rear end, are protruding lugs 10 carried slidably through slots 11 formed within the side partitions 12 and slidably engaging slots 13 formed through the free moving end of arms 14 which at their opposite ends are rigidly attached to a horizontal shaft 15.

The shaft 15 is journalled through the partitions and also the plate 16, which forms a part of the spring supporting frame 17, which supports carry the outer end of a spiral spring 18 having its inner end attached to said shaft and so coiled as to exert rotating force upon the shaft 15 sufficient to instantaneously throw open the drawer 8 by means of its attached arms 14 which engage the pins 10 attached to the sides of the drawer. This is done at close of a time interval when a drawer catch 19 is automatically disengaged by means of a time clock mechanism comprising a timing clock 20 provided with the conventional spring 21, together with an escapement pendulum and bob 22, supported in a frame 24 and also a heavy weight bob 23 to balance sufficient spring force to operate the drawer catch.

The spring 21 is provided with a winding stem or shaft 25 extending forwardly through the front of the cabinet terminating in an operating knob 26 encircled by a graduated scale indicating predetermined time intervals subject to regulation for toasting. The shaft 25 is provided with an arm 27 carrying at its extremity a hinged extension 28 normally overreaching an antifriction wheel 29 rotatably disposed at the upper extremity of a catch operating lever 30 which carries a counter weight 31 sufficiently heavy to raise the opposite end of the lever which is fulcrumed on a pin 32 and engaging a groove 33 in the drawer catch bolt 34 so as to engage the rear side of the catch plate 35 and secure the drawer in a closed position.

Figure 2:
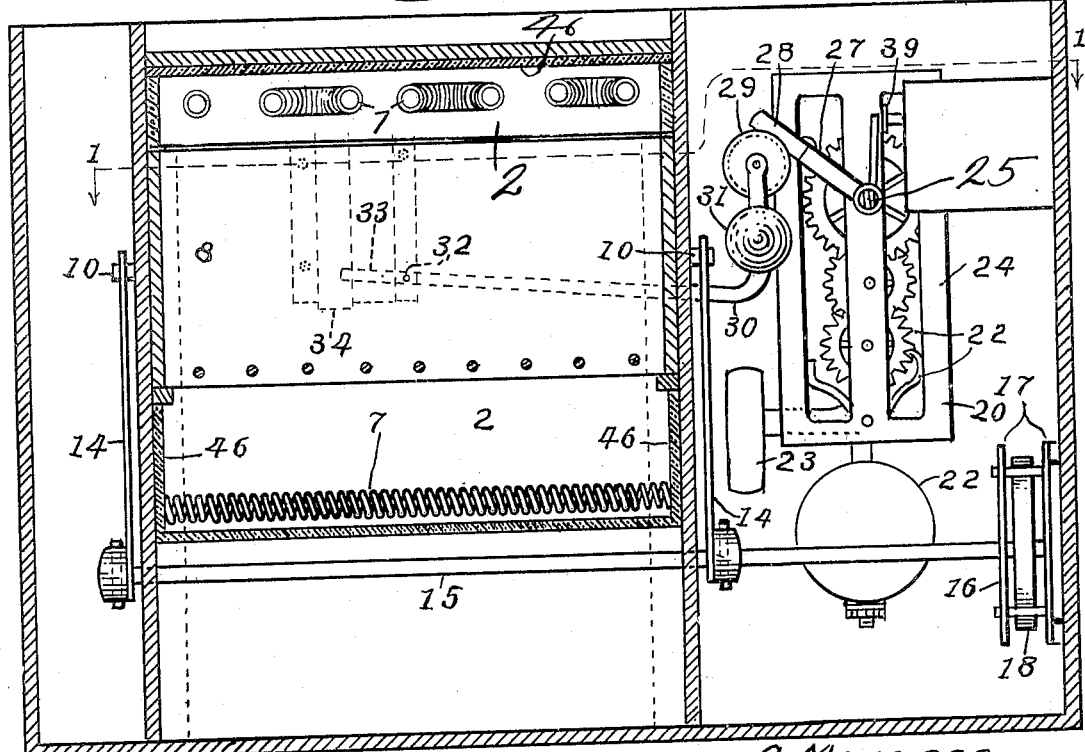
Figure 2 is a vertical longitudinal sectional view taken on line 2—2 of Figure 1.

Referring to Figures 5 and 6 it will be seen that the said shaft 25 when rotated in a counter-clockwise direction by the knob 26 will carry the arm 27 and hinged extension 28 downward, carrying the hinge 36 along the path indicated by the broken line 37 while the extension 28 will obviously fall back permitting the arm to assume any pre-established position below the wheel 29 at which time a reverse movement will take place (this being produced through the force of the escapement controlled spring 21) and continue during the time interval required to complete the toasting operation and the said wheel has assumed the position shown in full lines, Figure 2, thus raising the lever sufficiently to release the drawer catch and permit it to be thrown open.

The shaft 25 is also provided with an arm 38 normally engaging a spring actuated switch button 39 maintaining an open electric circuit through the heating coils 6 and 7 which arm when released from engaging with said button by revolving the shaft as above explained, closes the circuit so as to provide the oven with heat for a toasting operation.

Aside from the automatic drawer releasing mechanism there is also provided a manual means for this operation comprising a rod 41 provided with an expansion spring 42 tending to draw it forward, its outward end terminating in a push button 43 and its opposite end pivoted upon an angle lever 44, fulcrumed about a pivot 45 secured upon the side of the slotted partition 12 and its opposite end engaging the under side of the catch operating lever 30 so that when the button is pushed inward the catch bolt 34 will be forced down permitting the drawer to be forced open as explained above.

The heating chambers are provided with heat insulation 46 disposed over the inner sides thereof so as to prevent loss of heat and retaining a comparatively low temperature in the adjoining chambers.

Provision for regulating the temperature of the heating coils is made by means of a rheostat 47 which may be of any conventional form being disposed in the chamber 3 in circuit with the conductive wires 48 and provided with an operating knob 49 external to the oven.

The invention having been set forth what is claimed as new and useful is:

A time controlled latching device comprising a pivoted arm, an upwardly extending arm carried by one end of the pivoted arm, a roller carried by the upwardly extending arm, a time controlled mechanism to one side of the roller, a rotatable shaft carried by said time controlled mechanism, a radial arm carried by the shaft and extending towards the roller and a hinged extension arm carried by the radial arm and extending into the path of the roller and forming means whereby upon rotation of the shaft in one direction, said latch arm will be rocked and when rotated in the opposite direction said extension arm will hingedly move when engaging the roller without rocking the latching arm.

In testimony whereof I hereunto affix my signature.

ALEXANDER MARAGOS.